United States Patent
Paulson

[11] 3,775,183
[45] Nov. 27, 1973

[54] AQUEOUS ELECTROLYTE SOLUTION CONTAINING AN ETHOXYLATED ROSIN AMINE FOR USE IN A RECHARGEABLE ELECTRIC BATTERY

[75] Inventor: John W. Paulson, Madison, Wis.

[73] Assignee: ESB Incorporated, Philadelphia, Pa.

[22] Filed: June 15, 1972

[21] Appl. No.: 263,315

[52] U.S. Cl.................... 136/30, 136/137, 136/155
[51] Int. Cl. .......................................... H01m 43/06
[58] Field of Search...................... 136/6, 137, 154, 136/155, 30; 204/55 R; 260/563 R

[56] References Cited
UNITED STATES PATENTS
| | | | |
|---|---|---|---|
| 2,510,284 | 6/1950 | Haggard | 260/563 R |
| 3,540,936 | 11/1970 | Salkind | 136/137 |
| 3,634,138 | 1/1972 | Voorhies et al. | 136/137 |

Primary Examiner—Donald L. Walton
Attorney—Robert H. Robinson et al.

[57] ABSTRACT

An electric battery having an azodicarbonamide compound as the depolarizer in which the electrolyte consists essentially of an aqueous solution of zinc chloride, ammonium chloride and an ethoxylated rosin amine. It is preferred that the aqueous electrolyte solution have a pH ranging from about 2.5 to about 5. The aqueous electrolyte solution may contain from about 5 to about 50% by weight of zinc chloride, up to about 25% by weight of ammonium chloride and from about 0.1 to about 5% by weight of an ethoxylated rosin amine with the balance of the solution being water. The ethoxylated rosin amine has the following general formula

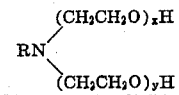

wherein R is a radical selected from abietyl, dihydroabietyl, tetrahydroabietyl or dehydroabietyl corresponding with the organic radical of the rosin amine from which it was produced. X and y may range from 0 to 20 with the sum of x and y being at least 1 but not exceeding about 20. The improved electrolyte of this invention reduces the gassing rate of the zinc anode in said electrolyte, it improves the redeposition of the zinc active material during the recharging of the battery, and it provides a battery having a substantially improved cycle life.

5 Claims, No Drawings

AQUEOUS ELECTROLYTE SOLUTION CONTAINING AN ETHOXYLATED ROSIN AMINE FOR USE IN A RECHARGEABLE ELECTRIC BATTERY

BACKGROUND OF THE INVENTION

In the standard flashlight battery, also known as a Leclanche cell, the negative electrode is a zinc can which also functions as the cell container, the cathode mix is manganese dioxide mixed with a conductive carbon and an aqueous electrolyte solution containing ammonium and zinc chlorides, and the separator comprises paper or a paste of starch and flour or other gelling agent. Throughout the years, there have been many attempts to improve the depolarizers used in this type of battery, and in particular, those skilled in the art have searched for depolarizer materials which are rechargeable, particularly after deep discharge.

U.S. Pat. No. 3,357,865 which issued to Stanley M. Davis, Charlotte M. Kraebel and Richard A. Parent on Dec. 12, 1967 discloses that substituted azodicarbonamide compounds have been found to be effective depolarizer materials which are capable of being recharged, even after complete discharge. Initial attempts to use the azodicarbonamide compounds as the depolarizer in cells having a standard Leclanche dry cell construction, with the azodicarbonamide compound being substituted for the manganese dioxide depolarizer, resulted in cells having poor cycle life.

One of the principal reasons for the poor cycle life is the irreversibility of the zinc electrode which dissolves in the electrolyte during discharge of the cell and is not redeposited efficiently during charging of the cell. The failure of the rechargeable zinc-azodicarbonamide cell is due to the irregular growth of the redeposited zinc during charging which results in an electronic shorting from the zinc can to the azodicarbonamide-carbon cathode. When this occurs, the reoxidation rate of the reduced azodicarbonamide depolarizer is slowed down and it is practically impossible to recharge the cell for useful discharge. Continued cycling of the cell, once it has been shorted by a zinc growth, results in an increasing number of the electronic short circuits through the zinc growths which penetrate the separator and contact the azodicarbonamide depolarizer material. As a result, the charge acceptance by the reduced azodicarbonamide material is impaired.

SUMMARY OF THE INVENTION

It is the general purpose of this invention to provide an improved electrolyte for an electric battery employing an organic depolarizer of the azodicarbonamide type. The improved aqueous electrolyte found to be effective in accordance with this invention consists essentially of zinc chloride, ammonium chloride and ethoxylated rosin amine, with the balance being water. It is preferred that the proportions of the materials comprising the aqueous electrolyte be selected to provide a pH ranging from about 2.5 to about 5. It has been found that the aqueous electrolytes of this invention reduce the gassing of the zinc electrode during both charging and discharging, provide an improved redeposition of the dissolved zinc active material during the recharging of the battery and substantially improve the cycle life of the battery.

DESCRIPTION OF THE PREFERRED EMBODIMENT

The overall reaction of the zinc anode during the recharging process may be reported by the following equation:

$$2Zn^{++} + 2H_2O + 4e \rightarrow Zn + Zn(OH)_2 + H_2$$

The proportion of zinc and zinc hydroxide in the redeposited zinc active material can vary widely depending upon the electrolyte composition and the electrolyte pH at the zinc anode surface during charging. The freshly deposited zinc active material is sufficiently reactive in the aqueous electrolyte to form substantial amounts of the zinc hydroxide ($Zn(OH)_2$). The formation of the zinc hydroxide is undesirable because it results in the loss of water from the electrolyte and most particularly because active zinc ions are lost by the formation of the unreactive zinc hydroxide. It has been found that the formation of zinc hydroxide upon recharging occurs to a considerable extent in conventional Leclanche electrolyte solutions comprising ammonium chloride, zinc chloride and water.

The deposition characteristic of the redeposited zinc active material is affected by the nature of the zinc hydroxide which is formed at or on the deposition surface of the zinc anode. It has been found that the thickness and the porosity of the zinc hydroxide film affects its conversion into useful zinc active material. The deposition of metallic zinc with zinc hydroxide as an intermediate product may be represented by the following reactions:

$$Zn(OH)_2 + 2H^+ + 2e \rightarrow Zn + 2H_2O$$
$$Zn + 2H^+ \rightarrow Zn^{++} + H_2$$
$$Zn^{++} + 2e \rightarrow Zn$$

The two reactions in which there is no zinc hydroxide present represent the redissolution of the freshly deposited zinc and the direct discharge of the $zinc^{++}$ ion. If the pH is very low, there is no zinc hydroxide present which is desirable, but it has been found that an electrolyte having particularly low pH (2.0 or below) causes a break down of the azodicarbonamide depolarizer which results in poor cell performance. If the pH is too high (above 5.0), the zinc hydroxide layer becomes too thick and the formation of the zinc is in the form of a sponge-like mass which loosely adheres to the underlying zinc electrode surface and also results in poor cell performance.

It has been determined that if the electrolyte pH ranges from about 2.5 to about 5, a reasonably dense and adherent deposit of zinc will occur and the azodicarbonamide depolarizer will not be substantially adversely affected. The maintainance of the proper pH of the aqueous electrolyte is important, and it has been determined that the aqueous electrolyte compositions of this invention are effective for maintaining the proper pH.

In accordance with this invention, the electrolyte consists essentially of an aqueous solution of zinc chloride with up to about 25% by weight of ammonium chloride and from about 0.1 to about 5% by weight of an ethoxylated rosin amine. It is particularly preferred that the aqueous electrolyte consist essentially of about 5 to about 50% by weight of zinc chloride, from about 2 to about 25% by weight of ammonium chloride and from about 0.1 to about 2% by weight of ethoxylated rosin amine with the balance being water. Other compounds such as mercuric chloride may also be present in the electrolyte.

The ethoxylated rosin amines added to the aqueous electrolyte of this invention have the following formula:

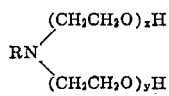

wherein R is a radical selected from abietyl, dihydroabietyl, tetrahydroabietyl, or dehydroabietyl corresponding with the organic radical of the rosin amine from which it was produced. X and y in the general formula may range from 0 to 20, and the sum of x and y is at least 1 but does not exceed about 20.

The term "rosin amine" as used in this specification and the claims which follow include broadly the primary amines derived from various rosins or rosin acids whereby the carboxyl of the rosin or rosin acid is converted into an amino ($-CH_2NH_2$) group. Rosin amines included within this scope are gum and wood rosin amines containing chiefly abietyl; dehydrogenated rosin amines derived from dehydrogenated rosin and containing chiefly dehydroabietylamine; rosin amine derived from hydrogenated gum or wood rosin and containing chiefly dihydro- and tetrahydroabietylamine; heat treated rosin amine derived from heat treated rosin; polymerized rosin amine derived from polymerized rosin; isomerized rosin amine derived from isomerized rosin and containing substantial amounts of abietylamine; and the rosin amines derived from the pure rosin acids, namely, abietylamine, dihydroabietylamine, dehydroabietylamine and tetrahydroabietylamine.

As used in this specification, the abietyl, hydroabietyl and dehydroabietyl amine radicals are referred to with the intention that they be considered broadly as covering rosin materials containing those radicals as major constituents. Thus, the products derived from rosin are considered to have the abietyl radical as the major constituent, the products derived from hydrogenated rosin are considered to have hydroabietyl radicals as the major constituent and dehydrogenated rosin is considered to have dehydroabietyl as the major constitutent. It is not intended, however, to exclude the possiblity of minor amounts of each of the various rosin amines in any of the references to specific rosin amines.

A detailed description of the preparation of the ethoxylated rosin amines is set forth in U.S. Pat. No. 2,510,284. In particular, it should be noted that either monoethanol rosin amine or diethanol rosin amine are first produced in the absence of a catalyst and thereafter, the ethanol rosin amines are further reacted with ethylene oxide to increase the ethylene oxide content of the ethoxylated rosin amines. The ethoxylated rosin amines useful as an electrolyte additive in accordance with this invention are clear oily fluids in contrast to some ethylene oxide condensates of rosin amines which are wax-like solids.

The improved electrolytes of this invention are useful in secondary batteries which employ an azodicarbonamide compound, both substituted and unsubstituted, as the depolarizer. These azodicarbonamide depolarizers may be generally represented by the following formula:

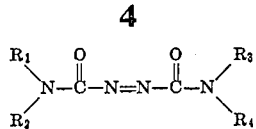

where $R_1$, $R_2$, $R_3$ and $R_4$ may be hydrogen, alkyl of one to eight carbon atoms, mono- and dicarbocyclic aryl or substituted aryl, cycloalkyl, arakyl, alkoxyalkyl, cyanoalkyl, haloalkyl, nitroalkyl, alkenyl, and where $R_1$, $R_2$ and/or $R_3$ and $R_4$ when alkyl may be joined together through a nitrogen, sulfur or oxygen linkage to form a heterocyclic ring. Unsubstituted azodicarbonamide, when $R_1$, $R_2$, and $R_3$ and $R_4$ are all hydrogen, is also useful as a depolarizer material in accordance with this invention, when used either alone or in combination with substituted azodicarbonamide compounds. The preferred azodicarbonamide compounds are those in which the nitrogen atoms carry an alkyl radical of one to four carbon atoms. As disclosed in U.S. Pat. No. 3,357,865, it is possible to use the corresponding substituted or unsubstituted biurea and oxidize it by charging the cell in the presence of an appropriate catalyst, thereby forming an azodicarbonamide compound in situ in the cell. Furthermore, mixtures of the azodicarbonamide compounds may be used as depolarizer as well as the compounds individually.

The azodicarbonamide compounds are present in the cathode mix in amounts ranging from about 10 to about 60% by weight of the total wet mix. The cathode mix also contains eletrolyte solution and highly conductive carbon, such as graphite, acetylene black or other high surface area carbon blacks.

Zinc or zinc alloys are the preferred anode active materials used in combination with the improved aqueous electrolyte of this invention. The zinc active material may be used as a can or container in a manner similar to that used in conventional flashlight batteries.

It is preferred to use a laminate separator in which a barrier material, such as cellophane, is laminated to an absorbent material such as kraft paper, starch, flour carboxymethyl cellulose and other gel forming materials. Particularly outstanding results are achieved using cellophane as the barrier material laminated to an absorbent material comprising a thermoplastic resin (ethylene/vinyl acetate copolymer) as a continuous binder matrix for a gelling agent such as a starch/wheat flour mixture or carboxymethyl cellulose.

In accordance with this invention, the cycle life of batteries employing an azodicarbonamide depolarizer material in combination with a zinc anode are substantially improved by utilizing an aqueous electrolyte containing a substantial portion of ethoxylated rosin amine and having a pH ranging from about 2.5 to about 5.

This invention is further described in the following examples which illustrate the improvement in the reduction of gas evolution and the improvement in the redeposition of the zinc active material achieved with the aqueous electrolyte solution of this invention.

EXAMPLE I

An aqueous electrolyte solution was evaluated and its ability to reduce the gassing of a zinc electrode during discharging, charging, and storage after discharge and charging. The following electrolytes were evaluated:

|  | Electrolyte A | Electrolyte B |
|---|---|---|
| zinc chloride | 15% | 15% |
| ammonium chloride | 7% | 7% |

| | | |
|---|---|---|
| water | 78% | 77% |
| ethoxylated rosin amine (Polyrad 1110A) | | |
| pH | 4.53 | 4.68 |

A zinc electrode was placed in the aqueous electrolyte solutions and cycled under flooded conditions, i.e., an excess of electrolyte. The zinc electrode had a surface area of 0.25 square inches, and the current density used to recharge the electrode was 0.008 milliamps per square inch. The zinc electrode was discharged against a zinc counter-electrode with a constant current power supply providing the current. The electrode was discharged and charged for 12 cycles at room temperature and the hydrogen gassing rate (cc/day/in$^2$) was measured with the following results:

| | Electrolyte A cc. | Electrolyte B cc. |
|---|---|---|
| Discharge | 1.43 | 0 |
| Storage | 0.311 | 0 |
| Charge | 3.98 | 0 |
| Storage | 3.89 | 0 |
| | 9.611 | 0 |

The aqueous electrolyte containing the ethoxylated rosin amine had excellent gassing properties as compared to the identical electrolyte containing no ethoxylated rosin amine.

EXAMPLE II

An aqueous electrolyte solution containing an ethoxylated rosin amine in accordance with this invention was evaluated to determine the zinc deposition properties of the electrolyte solution. The following apparatus was set up to measure and record the behavior of a plating system and to microscopically observe the plating process and the effect of the ethoxylated rosin amine additive. Two flat plate zinc electrodes were placed in a plastic container filled with the electrolyte being tested whereby both zinc electrodes were immersed in the electrolyte. The zinc electrodes were separated by non-conductive insulator spacers, with the zinc anode plate (negative) electrically connected to the negative terminal of a direct current power supply and the zinc counter electrode connected to the positive terminal of the power supply. The zinc anode plate was on the bottom of the container, and there were holes punched in the overlying zinc counter electrode through which the negative zinc electrode was microscopically viewed. The following electrolyte compositions were evaluated:

| | Electrolyte C % | Electrolyte D % |
|---|---|---|
| zinc chloride | 10 | 51 |
| ammonium chloride | 22 | 2.5 |
| ethoxylated rosin amine | 1 | .5 |
| water | 67 | 46 |

The test was conducted by using various plating current densities ranging from 10 to 100 milliamperes per square inch and observing the formation of zinc dendrites and the nature of the zinc plating. Electrolyte C yielded a very good plate of the zinc upon the electrode, but the first zinc dendrite bridging occured at one hour. Electrolyte D yielded an even better plate upon the electrode, a bright and smooth deposit of zinc active material. The test with Electrolyte D was discontinued before dendrite bridging occurred, but at the time it was discontinued the test had proceeded for 4 hours.

These test results indicate that the ethoxylated rosin amine additives are effective in reducing zinc dendrite formation at current densities up to at least about 100 milliamperes per square inch, and they improve the deposition of the zinc upon the zinc electrode during the charging process.

Having completely described this invention, what is claimed is:

1. An electric battery having a zinc anode, a cathode mix comprising an azodicarbonamide compound as the depolarizer, conductive carbon and an aqueous electrolyte solution having a pH ranging from about 2.5 to about 5 and a separator between said anode and cathode, said electrolyte consisting essentially of an aqueous solution of zinc chloride with up to about 25% by weight of ammonium chloride, and containing from about 0.1 to about 5% by weight of an ethoxylated rosin amine having the general formula

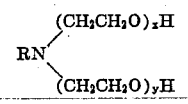

wherein R is a radical selected from abietyl, dihydroabietyl, tetrahydroabietyl, or dehydroabietyl corresponding with the organic radical of the rosin amine from which it was produced, and $x$ and $y$ range from 0 to 20 and the sum of $x$ and $y$ is at least 1 but does not exceed about 20.

2. A battery in accordance with claim 1 in which $x$ and $y$ range from about 2 to 10.

3. A battery in accordance with claim 1 in which the depolarizer is dibutyl azodicarbonamide.

4. A battery in accordance with claim 1 in which the separator is laminated and comprises at least one layer of cellophane and at least one layer of a vinyl acetate-ethylene copolymer matrix containing a gelling agent.

5. A battery in accordance with claim 1 in which the aqueous electrolyte consists essentially of from about 5 to about 50% by weight of zinc chloride, about 2 to about 25% by weight of ammonium chloride, about 0.1 to about 2% by weight of the ethoxylated rosin amine and the balance is water.

* * * * *